US008339455B2

(12) United States Patent
Baba et al.

(10) Patent No.: US 8,339,455 B2
(45) Date of Patent: Dec. 25, 2012

(54) SYSTEM FOR MONITORING PERSONS BY USING CAMERAS

(75) Inventors: Kenji Baba, Kodaira (JP); Takaaki Enohara, Hino (JP); Yusuke Takahashi, Kawasaki (JP); Yoshihiko Suzuki, Tokyo (JP); Akira Sawada, Kiyose (JP); Nobutaka Nishimura, Koganei (JP); Ryoichi Kurata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 385 days.

(21) Appl. No.: 12/646,805

(22) Filed: Dec. 23, 2009

(65) Prior Publication Data

US 2010/0157062 A1 Jun. 24, 2010

(30) Foreign Application Priority Data

Dec. 24, 2008 (JP) ................................ 2008-328791

(51) Int. Cl.

*H04N 7/18* (2006.01)
*H04N 5/445* (2006.01)
*G05B 19/00* (2006.01)
*G06K 9/00* (2006.01)

(52) U.S. Cl. ......... 348/156; 348/159; 348/564; 340/5.7; 382/115

(58) Field of Classification Search ........................ None
See application file for complete search history.

(56) References Cited

U.S. PATENT DOCUMENTS 5,163,094 A * 11/1992 Prokoski et al. .............. 382/118
2004/0145660 A1* 7/2004 Kusaka ...................... 348/211.2
2005/0205668 A1 9/2005 Sogo
2005/0213796 A1 9/2005 Ikoma et al.

FOREIGN PATENT DOCUMENTS

| | | | |
|---|---|---|---|
| CN | 1661634 | A | 8/2005 |
| EP | 1 696 393 | A2 | 8/2006 |
| JP | 2001-052273 | | 2/2001 |
| JP | 2004-005511 | | 1/2004 |
| JP | 2004-360200 | | 12/2004 |
| JP | 2005-101906 | | 4/2005 |
| JP | 2005-146709 | | 6/2005 |
| JP | 2006-325064 | | 11/2006 |
| JP | 2007-303239 | | 11/2007 |
| JP | 2008-117264 | | 5/2008 |

(Continued)

OTHER PUBLICATIONS

Notification for Reasons of Rejection issued by the Japanese Patent Office in Japanese Patent Application No. 2008-328791 on Nov. 24, 2010 and English translation of same (7 pages total).

(Continued)

*Primary Examiner* — Ranodhi Serrao
(74) *Attorney, Agent, or Firm* — Finnegan, Henderson, Farabow, Garrett & Dunner, L.L.P.

(57) ABSTRACT

According to one embodiment, a monitoring system is provided, which has a personal authentication unit and a camera. The personal authentication unit is provided near a security gate and authenticates a person allowed to pass through the security gate. The camera photographs an area near the security gate, in which the personal authentication unit is provided. The monitoring system further has a data generation unit configured to generate personal attribute data about the person authenticated by the personal authentication unit, a person identification unit configured to identify the person authenticated, on the basis of video data generated by the camera, and a monitoring data generation unit configured to generate monitoring data composed of video data and metadata. The video data represents an image including the person identified by the person identification unit. The metadata is associated with the video data and containing the personal attribute data.

9 Claims, 11 Drawing Sheets

FOREIGN PATENT DOCUMENTS

| | | |
|---|---|---|
| JP | 2006-146378 | 6/2008 |
| WO | WO 2008/054410 A2 | 5/2008 |

OTHER PUBLICATIONS

Notification of the First Office Action in Chinese Application No. 200910266370.9, issued by the State Intellectual Property Office of the People's Republic of China, dated Sep. 14, 2011, and English translation thereof (11 pages total).

Extended European Search Report, including European Search Report and European Search Opinion, from the European Patent Office, dated Mar. 29, 2010, in European Patent Application No. 09180499.7 (6 pages).

* cited by examiner

| Channel | Frame No. | Time | Coordinate data for person |
|---|---|---|---|
| Ch1 | 00001 | XXXX | |
| | | | |
| | 00025 | XXXX | (x11-y11)-(x12-y12) |
| | | | (x21-y21)-(x22-y22) |
| | | | (x31-y31)-(x32-y32) |
| | | | |

60

| ID:1048 | Name | Department |
|---|---|---|

| Time | Event | ID | Name | Department |
|---|---|---|---|---|
| 12:30:30 | Entry | 1048 | X1 | Y1 |

SYSTEM FOR MONITORING PERSONS BY USING CAMERAS

CROSS-REFERENCE TO RELATED APPLICATIONS

This application is based upon and claims the benefit of priority from prior Japanese Patent Application No. 2008-328791, filed Dec. 24, 2008, the entire contents of which are incorporated herein by reference.

BACKGROUND OF THE INVENTION

1. Field of the Invention

The present invention relates generally to a system for monitoring persons in, for example, a building, and more particularly to a system for monitoring persons, by using images photographed by cameras.

2. Description of the Related Art

In any huge building, for example, security management is indispensable to monitor persons (including intruders) other than those authorized to enter the building or the respective rooms provided in the building. Generally, security management in the building is achieved in two aspects, namely physical security and security level.

A representative system that ensures the physical security is the video monitoring system. The video monitoring system has monitoring cameras and a video-data storage apparatus. The monitoring cameras photograph persons passing through, for example, a security gate (more precisely, the door to the room). The video-data storage apparatus store the video data representing images the monitoring cameras have photographed.

In the video monitoring system, the security manager and guards stationed in the building can obtain the images photographed by the monitoring cameras from the video-data storage apparatus, at all times or at any time desired, and can watch the images displayed on the display screens. They can therefore visually recognize the number of persons existing in the area covered by each monitoring camera and the behavior of each person in the area. From only the images photographed by the monitoring cameras, however, any person who has cleared the prescribed security rules cannot be identified. The "person who has cleared the prescribed security rules" is, for example, one not authorized to enter a particular room in the building.

A representative system that ensures the security level is a room entry/exit management system. The room entry/exit management system has a personal authentication apparatus and an entry/exit monitoring apparatus. The personal authentication apparatus authenticates any person in accordance with the data read from the smartcard the person holds, the code key the person has input, or the biometric data read from the person. The entry/exit monitoring apparatus releases the electromechanical lock provided on the door of a specific room, opening the physical gate to the room, when the person is authenticated as one authorized to enter and exit the room.

Thus, the room entry/exit management system is a system that monitors and controls and manages the entry and exit of persons, for a building or each room provided in the building. The room entry/exit management system manages data in accordance with the codes (ID numbers) the personal identification apparatus has acquired in identifying persons or with text data representing, for example, the names of persons.

The video monitoring system manages video data only. The room entry/exit management system does nothing but manages data. They cannot quickly identify persons, if any, who clear the security rules.

In recent years, a room entry/exit management system has been proposed, which is a combination of a tracking apparatus and a biometric identification apparatus (see, for example, Jpn. Pat. Appln. KOKAI Publication No. 2007-303239.) The tracking apparatus has a tracking camera configured to track and photograph a person. The biometric identification apparatus has an identification camera arranged near, for example, the door to the room. The room entry/exit management system only detects the number of persons identified and the number of persons not identified, and cannot store many frame images photographed by the tracking camera or display these images. Hence, this system cannot identify any person who has cleared the prescribed security rules, either.

BRIEF SUMMARY OF THE INVENTION

An object of this invention is to provide a monitoring system that can accurately and quickly identify, from images of persons, any person who violates prescribed security rules.

A monitoring system according to an aspect of the present invention comprises: a personal authentication unit provided near a security gate and configured to authenticate a person allowed to pass the security gate; a camera configured to photograph an area near the security gate, in which the personal authentication unit is provided; a data generation unit configured to generate personal attribute data about the person authenticated by the personal authentication unit; a person identification unit configured to identify the person authenticated, on the basis of video data generated by the camera; and a monitoring data generation unit configured to generate monitoring data composed of video data and metadata, the video data representing an image including the person identified by the person identification unit, and metadata associated with the video data and containing the personal attribute data.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of this invention will be described with reference to the accompanying drawings.

[Configuration of the System]

Figure 1:
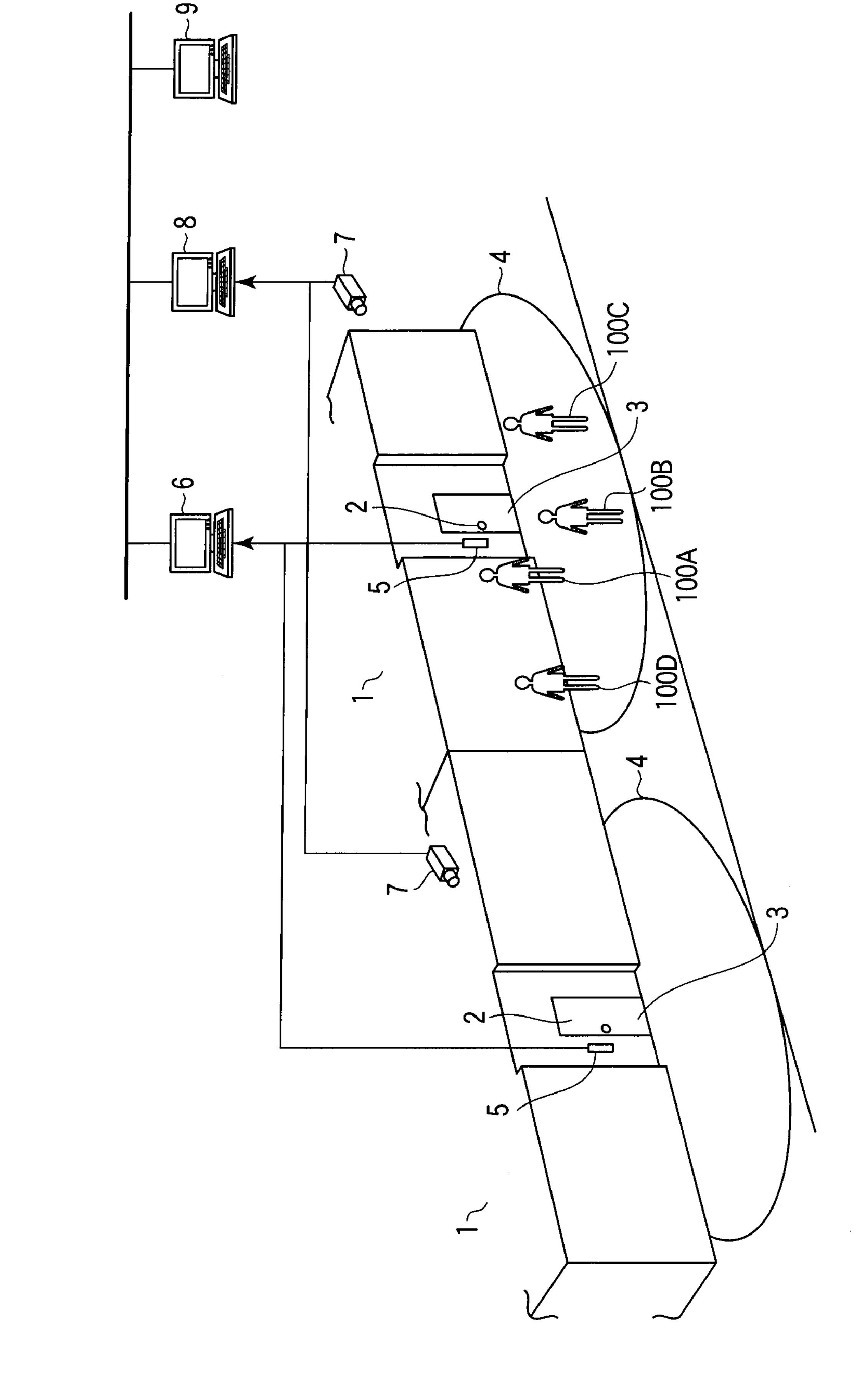
FIG. 1 is a diagram explaining a monitoring system according to an embodiment of this invention.

FIG. 1 is a diagram explaining a monitoring system according to an embodiment of this invention.

As may be understood from FIG. 1, the monitoring system uses monitoring cameras 7, monitoring persons 100A to 100D entering and exiting each of the rooms 1 provided in a building. The system has an entry/exit management apparatus 6 that manages any entry to the room 1 and any exit from the room 1. Each room 1 has a door and a security gate 3. The security gate 3 has an electromechanical lock 2 that electromechanically locks and releases the door. The electromechanical lock 2 is controlled by the entry/exit management apparatus 6, opening or closing the security gate 3. While the security gate 3 remains open, people can enter and exit the room 1.

The monitoring system has a personal authentication apparatus 5, an image processing apparatus 8, and an image storage apparatus 9. The personal authentication apparatus 5 is connected to the entry/exit management apparatus 6 and authenticates any person who is authorized to enter the room 1 through the security gate 3. The entry/exit management apparatus 6 controls the opening and closing of the security gate 3 in accordance with the data transmitted from the personal authentication apparatus 5 and representing whether the person is authorized to enter and exit the room 1. If the personal authentication apparatus 5 authenticates a person as authorized so, the entry/exit management apparatus 6 releases the electromechanical lock 2, opening the security gate 3. If the personal identification authentication 5 does not authenticate a person as authorized so, the entry/exit management apparatus 6 does not release the electromechanical lock 2.

The personal authentication apparatus 5 may be configured to transmit the data representing the result of identification to the entry/exit management apparatus 6, causing the apparatus 6 to control the electromechanical lock 2 in accordance with the data. The security gate 3 may be configured to open and close the door to the room 1 under the control of any opening/closing control mechanism other than the electromechanical lock 2.

The image processing apparatus 8 performs various processes on a video signal representing the image photographed by each monitoring camera 7, such as extraction of the images of persons 100A to 100D. Each monitoring camera 7 covers a photographing area 4 around the security gate 3 and generates a video signal. The video signal is transmitted to the image processing apparatus 8 via, for example, a local area network (LAN). The image processing apparatus 8 processes the video signal, generating video data. The video data is stored in the image storage apparatus 9.

The personal authentication apparatus 5, entry/exit management apparatus 6, monitoring cameras 7, image processing apparatus 8 and image storage apparatus 9 are connected by the LAN. Alternatively, the entry/exit management apparatus 6 and the image processing apparatus 8 may be connected by a dedicated communication line. The image storage apparatus 9 may be incorporated in the image processing apparatus 8 or may be provided outside the apparatus 8 and connected to the apparatus 8.

(Major Components of the System and their Functions)

Figure 2:
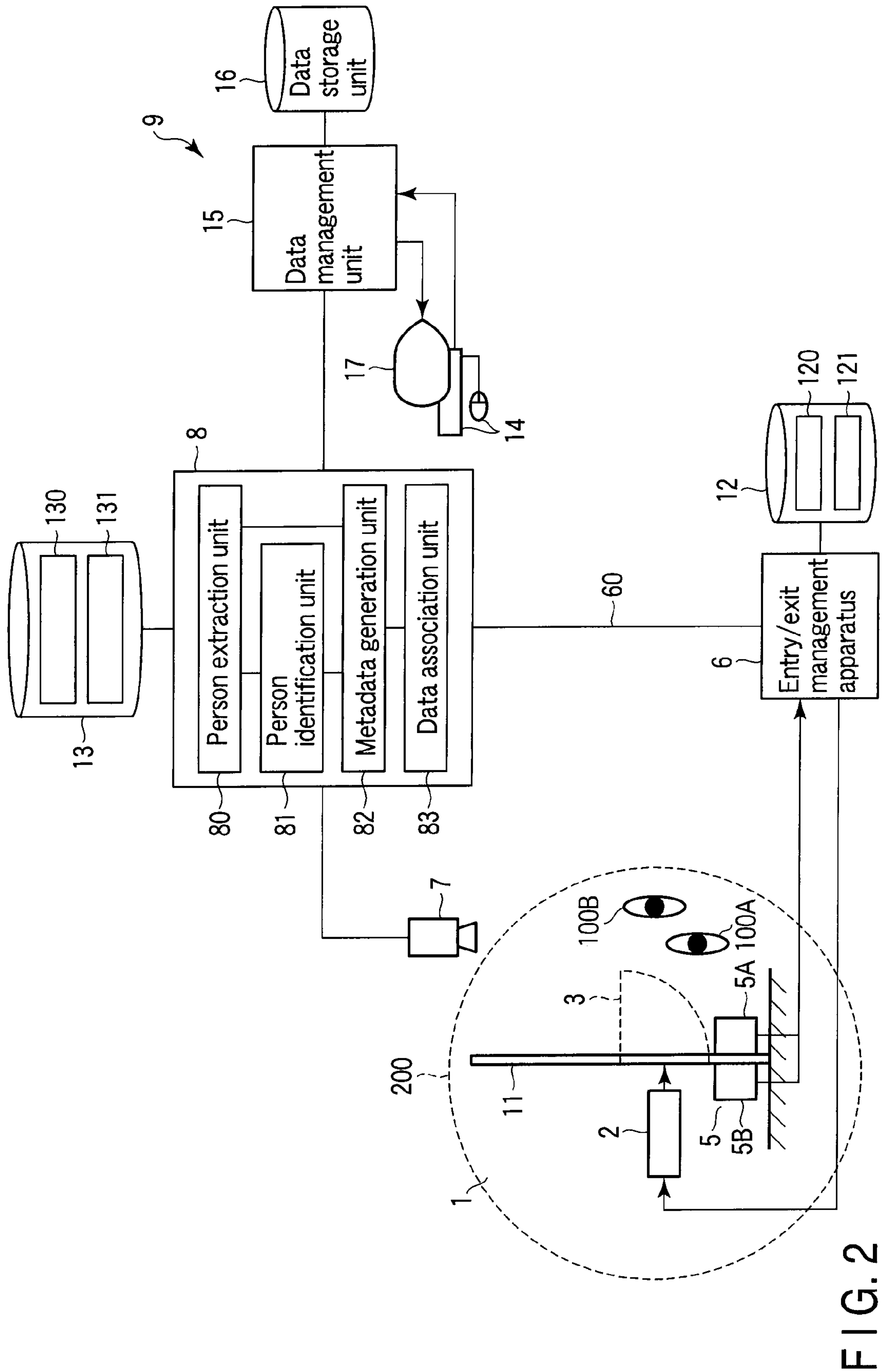
FIG. 2 is a block diagram showing the major components of the monitoring system according to the embodiment.

FIG. 2 is a block diagram showing the major components of the monitoring system according to the embodiment.

Each monitoring camera 7 of the monitoring system should hang from the ceiling as shown in FIG. 2 or be positioned to photograph the security gate 3 and personal authentication apparatus 5 from above in oblique directions. In FIG. 2, the broken line 200 indicates a circular area as viewed from above, partly inside the room 1 and partly outside the room 1. So positioned, each camera 7 can photograph persons 100A and 100B and some other persons standing near the security gate 3, at such angles that the images of these persons do not overlap at all. The monitoring camera 7 photographs persons 100A and 100B who stand near the security gate 3 and want to enter the room 1, at the rate of 30 frames per second, generating moving-picture data. The moving-picture data is transmitted from the monitoring camera 7 to the image processing apparatus 8.

The entry/exit management apparatus 6 is connected to a database 12 and can therefore refer to the data it needs to accomplish the entry/exit management. The database 12 holds an entry/exit table 120 and an entry/exit record 121. The entry/exit table 120 is a list of the persons authorized to enter and exit the room 1. The entry/exit record 121 shows who has entered and exited the room 1. More precisely, the entry/exit table 120 registers the ID numbers and names of the persons authorized to enter and exit each room 1, the departments to which they belong, and some other necessary data items. The entry/exit record 121 is time-series data that consists of the names of the persons who have entered and exited the room 1, the times they entered and exited the room 1, the departments they belong to, and the like. The entry/exit management apparatus 6 refers to these data items and edits the data items on the basis of, for example, the office regulations and personnel regulations of the company, thereby generating entry/exit record data and work record data for each department in predetermined formats. The entry/exit record data and the work record data, thus generated, are output from the entry/exit management apparatus 6.

The personal authentication apparatus 5 has two personal authentication devices 5A and 5B. The personal authentication devices 5A and 5B are provided outside and inside the room 1, respectively, and are connected to the entry/exit management apparatus 6. The personal authentication apparatus 5 may have the personal authentication device 5A only, which is provided outside the room 1. The personal authentication apparatus 5 incorporates a smartcard reader if smartcards are used as IC media in the monitoring system.

Anyone who wants to enter the room 1 (person 100A, for example) holds his or her smartcard in contact with, or holds the same near, the smartcard reader of the personal authentication device 5A. The smartcard reader reads the ID data, name, etc., from the smartcard. The personal authentication device 5A compares the data, thus read, with the identification reference data registered in the storage device incorporated in it, determining whether person 100A is authorized to enter the room 1. If the data is identical to the identification reference data, the personal authentication device 5A authenticates person 100A as authorized to enter the room 1 and transmits the result of identification to the entry/exit management apparatus 6. The result of identification contains the ID data of the person identified as authorized to enter the room 1. In accordance with the ID data, the entry/exit management apparatus 6 releases the electromechanical lock 2. The security gate 3 is thereby unlocked.

The personal authentication device 5A may be configured to acquire the identification reference data (e.g., ID data) stored in the entry/exit table 120, from the entry/exit management apparatus 6 through the LAN and then process the personal identification device, if the identification reference data is not registered in it. The personal authentication device 5B operates in the same way as the personal authentication device 5A, if any person wants to leave the room 1.

The entry/exit management apparatus 6 gives personal attribute data (or data about the person identified) 60 to the image processing apparatus 8, almost at the same time that the electromechanical lock 2 is released in accordance with the result of the authentication that the personal authentication apparatus 5 has performed. The personal attribute data (or data about the person identified) 60 contains the ID data, name and department. The data 60, which has been acquired from the personal authentication apparatus 5, is supplied to the image processing apparatus 8.

As described above, the personal authentication apparatus 5 incorporates a smartcard reader. Instead, the personal authentication apparatus 5 may have an identification device that utilizes biometric technology such as fingerprint identification, vein identification or face identification, or an identification device that performs radio frequency identification (RFID). If the biometric technology is used, the personal authentication apparatus 5 or the entry/exit management apparatus 6 stores pattern and characteristic data relating to the fingerprint identification, vein identification and face identification, and also the personal attribute data such as, at least, names and departments in association with the pattern and characteristic data.

The image processing apparatus 8 performs image processing by using a storage device 13 that is incorporated in it externally connected to it. The storage device 13 temporarily stores shape-pattern data 130 and video data 131. The shape-pattern data 130 represents the shapes of the head, shoulders and arms of a person and is used to identify the person. The video data 131 represents images photographed by the monitoring camera 7 (e.g., video data in units of frames).

The image processing apparatus 8 is constituted by a computer including software. For convenience, the image processing 8 will be explained as having, a person extraction unit 80, a person identification unit 81, and a metadata generation unit 82, and a data association unit 83.

The person extraction unit 80 performs a process of extracting the images of several persons from the video data representing the images photographed by the monitoring camera 7. If several persons (i.e., those who want to enter the room 1) stand near the security gate 3, the monitoring camera 7 transmits the video data representing these persons to the image processing apparatus 8. The person extraction unit 80 performs the background differential method or the time differential method, either known in the art, and detects the image of any objects moving in the image. Further, the unit 80 extracts the images of any persons moving, from the images of the moving objects. To increase the precision of detecting moving objects, the person extraction unit 80 should better determine the height, width and the like of each object in the image, from the video data representing a stereoscopic image of the object.

Moreover, the person extraction unit 80 refers to the shape-pattern data 130 stored in the storage device 13, thereby extracting the image of a person based on the standard human height and width. In this case, the person extraction unit 80 performs pattern matching, comparing the head-shape pattern contained in the shape-pattern data 130, with a circular shape in the actual image, thereby identifying the object having that circular shape as a person.

The person identification unit 81 performs a process of identifying any persons who as accessed the personal authentication apparatus 5 (5A and 5B), from the persons whose images have been extracted by the person extraction unit 80. The image processing apparatus 8 needs to receive the personal attribute data 60 from the entry/exit management apparatus 6, in order to identify any person who has accessed the personal authentication apparatus 5 (5A or 5B) and who has been authenticated by the apparatus 5 as a person allowed to enter and exit the room 1. Therefore, the person identification unit 81 must determine the behavior of any person who is accessing the personal authentication apparatus 5.

Figure 3A:
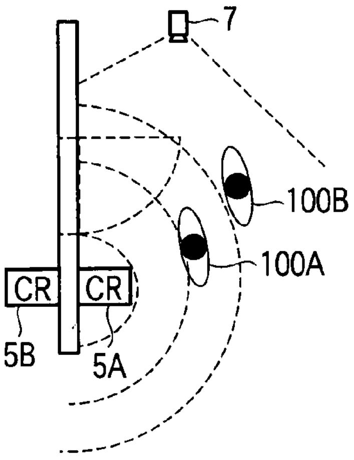
FIGS. 3A to 3D are diagrams explaining a process of identifying a person who has accessed the personal identification apparatus provided in the monitoring system according to the embodiment.
Figure 3B:
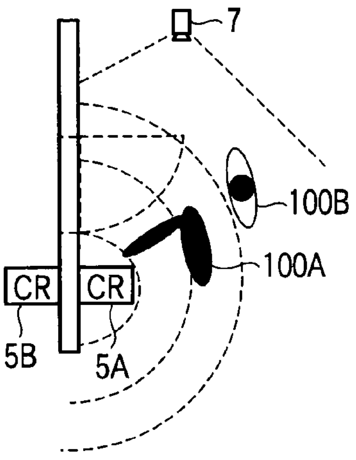
Figure 3C:
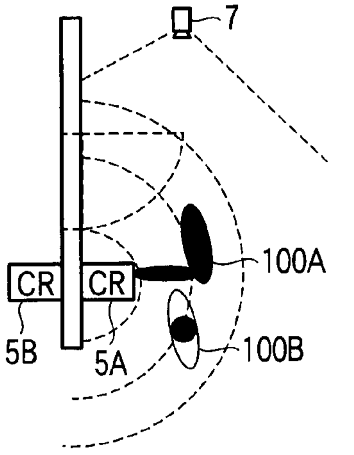
Figure 3D:
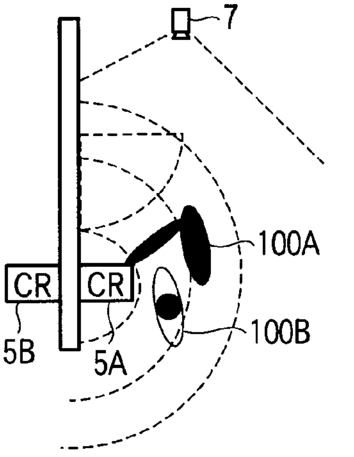

More specifically, if a person has approached the personal authentication device 5A, now at only arm's distance from the device 5A as shown in FIG. 3A, the person identification unit 81 determines him or her as person 100A who has been authorized to enter the room 1. The distance corresponding to the arm length can be easily detected from the image of the person.

The image of the arms of any person can be extracted from the shape-pattern data 130 that represents a human-figure model composed of the head, shoulders, trunk and arms. That is, the shoulders or trunk of a person is first identified with those of the human-figure model, and the parts of the person, which move as the shoulder or trunk moves, are then identified as the arms of the human-figure model. The arms are thereby extracted from the image represented by the shape-pattern data 130. Hence, even if the arm parts (black parts) behave in various patterns as shown in FIGS. 3A to 3D, person 100A standing near the personal authentication device 5A or standing behind person 100B can be identified as having accessed to the personal authentication device 5A.

The person identification unit 81 may analyze the changes of the region of the person whose image has been extracted by the person identification unit 81, and may determine that this person has accessed the personal authentication apparatus 5 (5A) if the shape of this region changes, moving toward the personal authentication apparatus 5 (5A).

If the stereoscopic image processing is used as described above, the monitored space can be represented as a stereoscopic image. Then, the parts of a human figure and the shapes thereof can be correctly recognized, and any person who has accessed the personal authentication apparatus 5 and thereby authorized to enter the room 1 can therefore be identified. Thus, very robust personal identification can be accomplished if any person who has accessed the personal authentication apparatus 5 is authenticated by using the data representing the distance between a person and the personal authentication apparatus 5 and the data representing how much the person stretches the arms.

The personal identification thus far described is smartcard identification, fingerprint identification or vein identification.

To perform face identification or iris identification, the monitoring system must be modified a little. To achieve face identification, for example, a camera is attached to the personal authentication apparatus 5. Because of the limited viewing angle of the camera, any person who wants to enter the room 1 must stand at limited positions with respect to the camera. In the case of iris identification, any person who wants to enter the room 1 must stand, with his or her head almost touching the personal authentication apparatus 5.

The metadata generation unit 82 associates the images of persons with the personal attribute data 60, generating metadata to be stored in the storage apparatus 9. More precisely, the metadata generation unit 82 receives video data (representing frame images) of each channel, i.e., the video data generated by each monitoring camera 7. From the video data, the metadata generation unit 82 generates metadata that is a combination of the frame number, photographing time, man-region coordinate data and personal attribute data 60. The man-region coordinate data pertains to a plurality of persons who appear in the frame image. The personal attribute data 60 pertains to the person authenticated by the personal authentication apparatus 5.

The data association unit 83 associates the video data with the metadata generated by the metadata generation unit 82. The video data and the metadata are transmitted to the storage apparatus 9. In some cases, a combination of the video data and metadata, which are associated with each other, will hereinafter be called "monitoring data."

The storage apparatus 9 has a data storage unit 16, which is the main unit configured to store the metadata and the video data. The storage apparatus 9 further has an input unit 14, a data management unit 15, and a display unit 17.

The input unit 14 is a keyboard, a pointing device or the like. When operated, the input unit 14 inputs data such as commands. The data management unit 15 is constituted by a microprocessor (CPU) and controls the inputting and outputting of data to and from the data storage unit 16, in accordance with the commands coming from the input unit 14. Further, the data management unit 15 controls the display unit 17 in response to the commands coming from the input unit 14, causing the display unit 17 to display, on the screen, the video data read from the data storage unit 16.

How the monitoring system operates will be explained in detail, with reference to FIG. 4 and FIG. 5.

Figure 4:
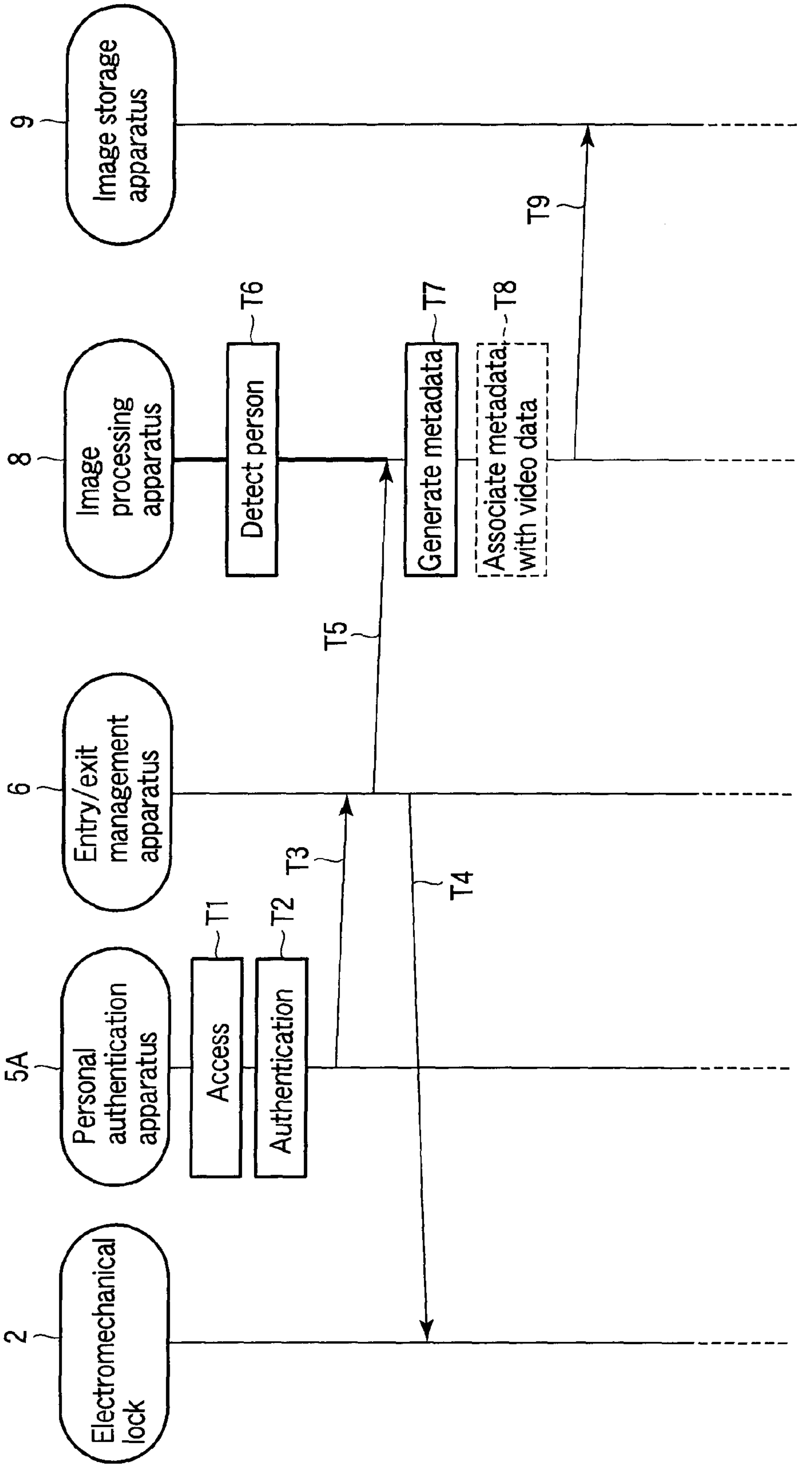
FIG. 4 is a diagram explaining how the monitoring system operates.

If person 100A, for example, places his or her smartcard into contact with the personal authentication device 5A, the device 5A accepts an access for personal identification, as seen from FIG. 4 (T1). The personal authentication device 5A reads the data recorded in the smartcard and identifies person 100A (T2). To be more specific, the device 5A compares the data read from the smartcard, with the identification reference data stored in it, thereby determining whether person 100A is authorized to enter the room 1. If person 100A is found to be authorized to enter the room 1, the data representing this is transmitted from the personal authentication device 5A to the entry/exit management apparatus 6 (T3). This data contains the ID data, name and department of person 100A.

At this point, the monitoring camera 7 scans the area near the security gate 3, at all times or at regular intervals, generating a video signal (e.g., video data in units of frames) that represents the images of several persons including person 100A. The video signal is transmitted to the image processing apparatus 8. The image processing apparatus 8 supplies video data 131 representing the frames, each assigned with a serial frame number, to the storage device 13. The video data 131 is temporarily stored in the storage device 13. Thereafter, the image processing apparatus 8 processes the video data, in order to identify person 100A (see T6 in the flowchart of FIG. 5).

On receiving the data about person 100A from the personal authentication device 5B, the entry/exit management apparatus 6 informs the image processing apparatus 8 of the ID data, name and department of person 100A (T5). Moreover, the entry/exit management apparatus 6 transmits a signal to the electromechanical lock 2, releasing the electromechanical lock 2 (T4). Therefore, the security gate 3 can be opened.

As described above, the image processing apparatus 8 generates metadata that contains the personal attribute data 60 about person 100A (T7). The metadata contains the frame number, the photographing time, and the man-region coordinate data pertains to the persons who appear in the frame image. Further, the image processing apparatus 8 associates the metadata with the video data, generating monitoring data and transmits the monitoring data to the storage apparatus 9 (T8). In the storage apparatus 9, the data storage unit 16 stores the monitoring data (i.e., metadata and video data) received from the image processing apparatus 8.

How the image processing apparatus 8 performs the sequence of processing images will be explained with reference to the flowchart of FIG. 5.

First, the person extraction unit 80 detects objects moving in the vicinity of the security gate 3, from the video data 131 stored in the storage device 13 (Step S1). As pointed out above, the method of detecting such objects is the background differential method or the time differential method, either known in the art. The person extraction unit 80 then identifies a region in which several persons exist and extracts the images of the persons (Step S2). More specifically, the person extraction unit 80 refers to the shape-pattern data 130 stored in the storage device 13, extracts the circular parts from the image, recognizes these parts as representing the heads of persons, thereby extracting the images of several persons.

Next, the person identification unit 81 identifies person 100A who has been authenticated by the personal authentication device 5A (Step S3). That is, the person identification unit 81 identifies any person as authorized to access the personal authentication device 5A, on the basis of the distance between the image of the person and the image of the personal authentication device 5A.

The image processing apparatus 8 determines whether the personal attribute data 60 representing the result of identification has arrived from the entry/exit management apparatus 6 (Step S4). If the personal attribute data 60 has not arrived (if NO in Step S4), the process returns to Step S1, whereby the video data for the next frame is processed.

If the image processing apparatus 8 has received the personal attribute data 60 from the entry/exit management apparatus 6 (if YES in Step S4), the process goes to Step S5. In Step S5, the person identification unit 81 determines, form a flag already set in it, whether the behavior of the arms should be taken into account. The behavior of the arms need not be considered if only one person authorized to access the personal authentication device 5A is found in Step S3. In this case (that is NO in Step S5), person 100A is finally identified as authorized to access the personal authentication apparatus 5A.

On the other hand, if the behavior of the arms needs to be considered, the person extraction unit 80 refers to the shape-pattern data 130 stored in the storage device 13, extracting the arm parts from the image of the person. The person identification unit 81 finally identifies person 110A identified by the personal authentication apparatus 5A, on the basis of the arm parts extracted by the person extraction unit 80 (Step S6).

Figures 6, 7:
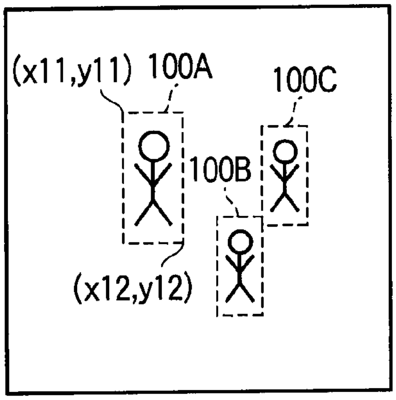
FIG. 6 is a diagram showing images of persons, which are displayed on the display unit of the monitoring system according to the embodiment.
FIG. 7 is a table showing exemplary metadata about images, which pertains to the embodiment.

Next, the metadata generation unit 82 associates the image of the person with the personal attribute data 60, generating metadata to store in the storage apparatus 9 (Step S7). More precisely, the metadata generation unit 82 generates such coordinate data items as shown in FIG. 6, i.e., data (x11, y21) about a man region 100A, data (x12, y22) about a man region 110B, and data (x13, y23) about a ma region 100C. Further, the metadata generation unit 82 generates metadata representing a table shown in FIG. 7. As shown in FIG. 7, the table shows the serial numbers of frames photographed by each camera 7 (i.e., each channel Ch), the photographing times of the respective frames, and the man-region coordinate data items pertaining the respective frames. That is, the metadata generation unit 82 associates this table with the personal attribute data 60, generating metadata. In other words, the metadata generation unit 82 performs mapping on the personal attribute data 60 supplied from the entry/exit management apparatus 6 (Step S8). The name of person 100A, contained in the personal attribute data 60, may be used as retrieval key. In this case, only the name may be associated with the associated frame number shown in the table.

Figure 8:
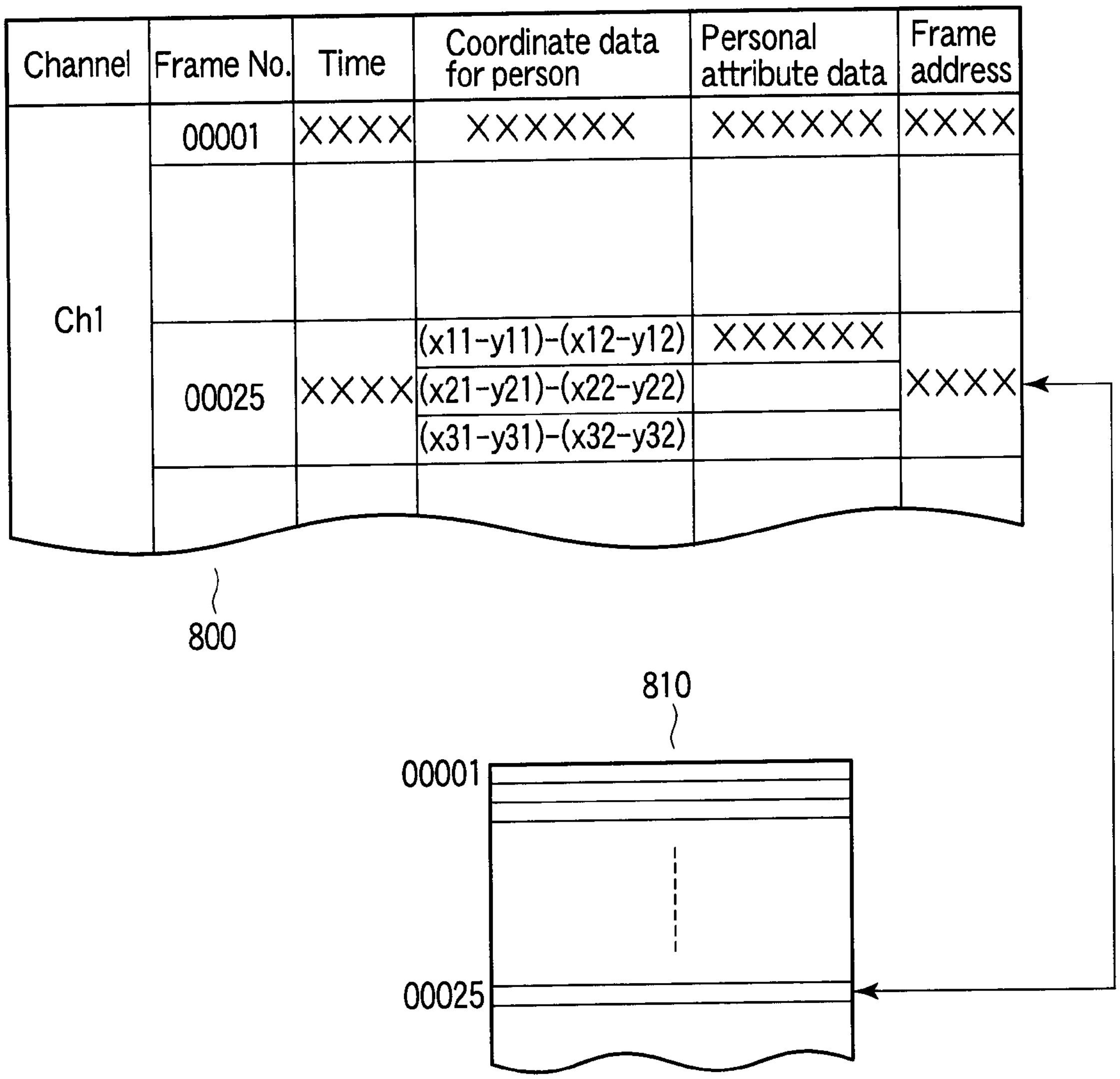
FIG. 8 is a table showing exemplary data stored in the image storage apparatus according to the embodiment.

Then, the data association unit 83 associates the metadata generated by the metadata generation unit 82, with the video data temporarily stored in the storage device 13 (i.e., video data identified with the frame number of person 100A), thus generating monitoring data. The monitoring data, thus generated, is transmitted to the storage apparatus 9 (Step S9). In the storage apparatus 9, the data management unit 15 adds a frame address 810 to the metadata 800 generated by the metadata generation unit 82, as illustrated in FIG. 8. The video data, thus labeled with the frame address 810, is stored in the data storage unit 16.

Figure 9:
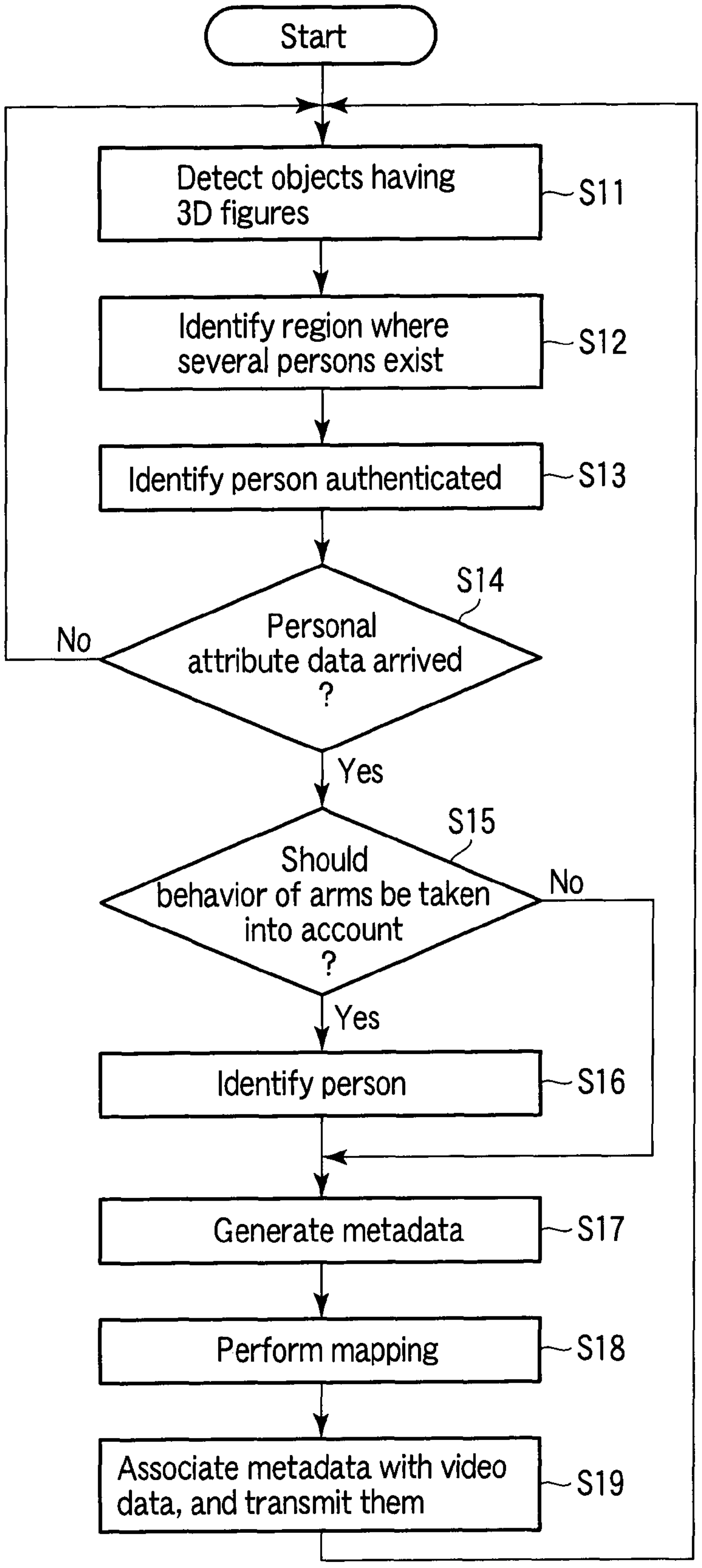
FIG. 9 is a flowchart explaining how the image processing apparatus performs a stereoscopic imaging process in the monitoring system according to the embodiment.

The method in which the image processing apparatus 8 performs the sequence of processing images has been explained with reference to the flowchart of FIG. 5. Nonetheless, a stereoscopic imaging process may be performed in the present invention, as will be explained with reference to the flowchart of FIG. 9.

In this case, the person extraction unit 80 performs a stereoscopic imaging process on the video data 131 stored in the storage device 13, detecting an object approaching the security gate 3, which object is represented as a three-dimensional figure (Step S11). Further, the person extraction unit 80 refers to the shape-pattern data 130, extracting the head part, shoulder part, trunk part, etc., of the object detected from the three-dimensional shape pattern. The unit 80 thus identifies a man region (Step S12).

Figure 5:
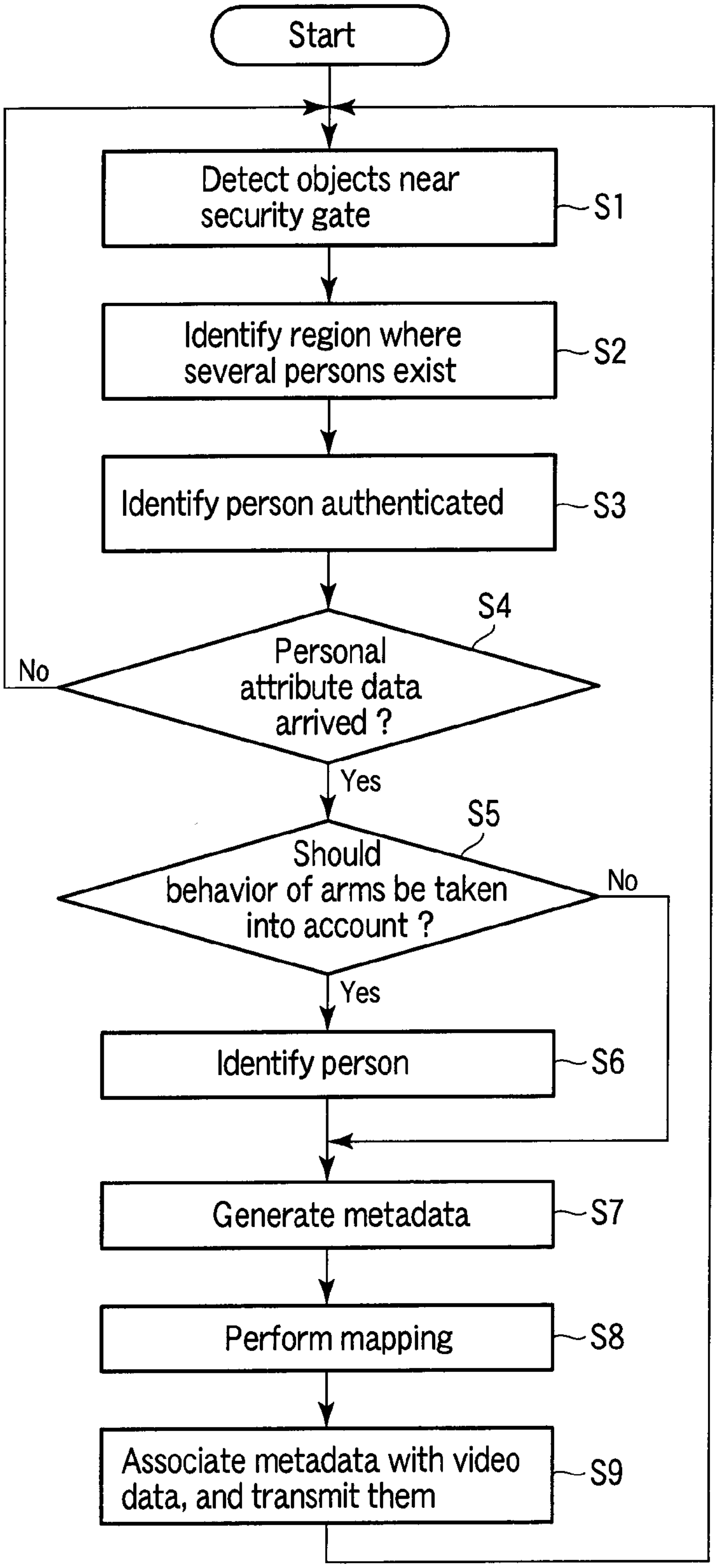
FIG. 5 is a flowchart explaining how the image processing apparatus performs a process of displaying the image of only one person in the monitoring system according to the embodiment.

Steps S12 to S19 are identical to Step S3 to S9 shown in FIG. 5, and will not be described.

As described before, the data management unit 15 adds a frame address to the metadata and video data which are contained in the monitoring data transmitted from the data association unit 83. The metadata and the video data, thus labeled with the frame address, are stored in the data storage unit 16. In accordance with the retrieval key input from the input unit 14, the data management unit 15 acquires the video data containing a frame data representing an image showing persons including person 100A. This video data is supplied to the display unit 17. The display unit 17 displays an image of person 100A on its screen, which is surrounded by, for example, a rectangular frame of broken lines. In the present embodiment, the data management unit 15 manages the personal attribute data about person 100A identified. The display unit 17 can therefore display an image of person 100A, mapped with the name, department, etc., of person 100A. Viewing this image displayed on the screen of the display unit 17, the security manager can quickly grasp the name, department, etc., of person 100A who has been authorized to enter the room 1. At this time, another person may try to enter the room 1, accompanying person 100A. If this person is not authenticated by the personal authentication apparatus 5, he or she will be recognized as an intruder who violates the prescribed security rules. This embodiment enables the security manager to find easily an intruder who attempts to enter the room 1, as person 100A enters the room 1.

In the monitoring system according to this embodiment, the image monitoring function of monitoring an image photographed by a camera and showing the persons trying to enter and exit a room in the building is linked with the entry/exit management function including personal identification. This enables the security manager to detect accurately and quickly any persons who violate the prescribed security rules.

In the storage apparatus 9 of the monitoring system according to this embodiment, the data storage unit 16 stores the metadata containing the ID data, name, department, etc., of any authorized person, together with the associated video data. Therefore, the system can retrieve the video data at the time an event occurs, such as the release of the electromechanical lock 2 to open the door 3, after the personal authentication apparatus 5 has identified a person at the door 3 as one authorized to enter the room 1.

That is, the data management unit 15 of the storage apparatus 9 can acquire the video data representing the image showing the person, when such an event occurs, by using a retrieve key which is, for example, the name contained in the personal attribute data supplied from the data storage unit 16. The data management unit 15 supplies the video data, thus retrieved, to the display unit 17. The display unit 17 can display, on its screen, the image represented by the video data.

In this case, the data management unit 15 can select and retrieve only the metadata contained in the video data. An event control table is easily generated, by using a function of formulating table data and managing the table data. Referring to the event control table, the data management unit 15 can quickly retrieve and display only the video data showing the person photographed at the time of the event.

Other Embodiments

Cooperation of the Cameras

Figure 10:
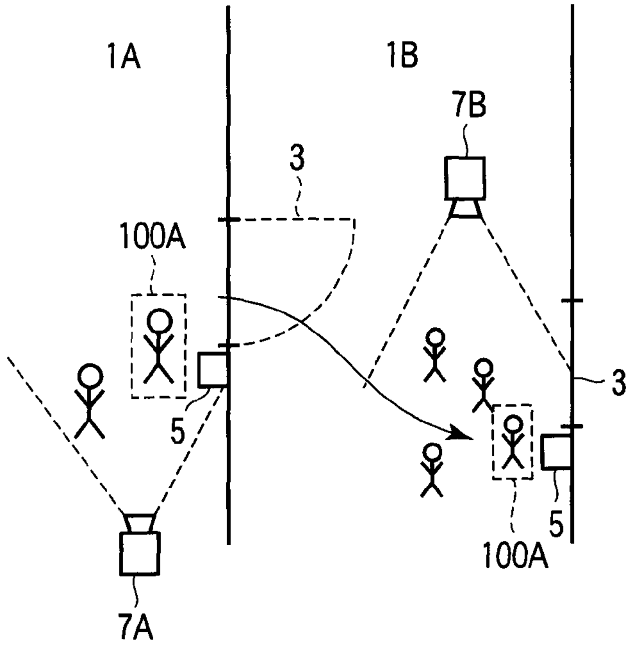
FIG. 10 is a diagram relating to another embodiment of the invention, explaining what is going on in adjacent rooms.
Figure 11:
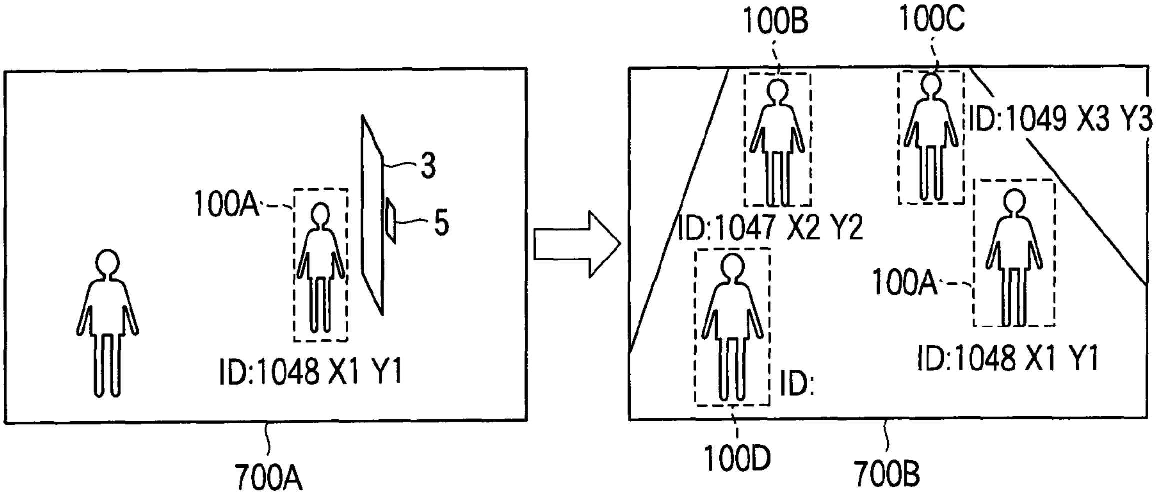
FIG. 11 is a diagram showing exemplary personal attribute data items used in the other embodiment of the invention.

FIGS. 10 and 11 are diagrams explaining how a monitoring system according to another embodiment of this invention operates by using a plurality of monitoring cameras 7A and 7B.

Most monitoring systems for use in buildings have a plurality of monitoring cameras. The monitoring cameras generate video data items, which are collected and supplied to a display unit 17. The display unit 17 can display, on its screen, the images represented by the video data items. The security manager can select any one of the images represented by the video data items and carefully view the image. As described above, the monitoring system according to this embodiment holds monitoring data, i.e., a combination of metadata and video data. The security manager can therefore identify each person appearing in the image.

More specifically, the system can superimpose, as seen from FIG. 11, the personal attribute data (metadata) of person 100A on the image of person 100B photographed by, for example, a monitoring camera 7A, the images of both person 100A and person 100B being displayed on the screen 700A of the display unit 17. The personal attribute data contains the ID data (1048), name (X1), department (Y1) and the like.

How the monitoring system, wherein the cameras 7A and 7B cooperate, operates will be explained with reference to FIGS. 10 and 11.

FIG. 10 explains what is going on in adjacent rooms 1A and 1B which people may enter and exit through one security gate 3 and in which monitoring cameras 7A and 7B are provided, respectively. The room 1B located deeper than the room 1A is an area which only those who belong to, for example, the research and development department can enter. (For example, only person 100A can enter the room 1A.

In this monitoring system, both the monitoring camera 7A and the monitoring camera 7B keep monitoring the room 1A and the room 1B, respectively, as is illustrated in FIG. 11. Assume that person 100A accesses the personal authentication apparatus 5 in order to walk from the room 1A into the room 1B. Then, the image of person 100A photographed by the monitoring camera 7A is displayed on the display screen 700A, and the personal attribute data (metadata) of person 100A is displayed on the display screen 700A, too.

The entry/exit management apparatus 6 informs the image processing apparatus 8 of the personal attribute data about person 100A. The image processing apparatus 8 receives the personal attribute data from the entry/exit management apparatus 6 and performs a process of superimposing this data on the video data generated by the monitoring camera 7B provided in the room 1B. Hence, the data management unit 15 causes the display unit 17 to display the image on the screen 700B shown in FIG. 11, in which the personal attribute data of person 100A is superimposed on the image of person 100B.

Because of the linkage of functions, which is achieved in the monitoring system, the security manager can recognize not only persons 100B and 100C, both existing in the room 1B and identified already, but also person 100A who has just moved from the room 1A into the room 1B, merely by viewing the image displayed on the screen 700B. If image of person 100D, on which no personal attribute data is superimposed, is displayed on the display screen 700B, the security manager can confirm that this person has entered the room 1B form the room 1A, along with person 100A. Hence, the security manager can determine that person 100D may be an intruder, i.e., a person violating the prescribed security rules.

As a modified linkage of functions, the monitoring system may be so configured that the image of person 100A is tracked as it moves, after the personal attribute data of person 100A has been superimposed on the video data generated by the monitoring camera 7B.

If this is the case, the image processing apparatus 8 extracts characteristic data representing the garment color, garment pattern, figure characteristics, facial characteristics, etc., of person 100A, from the images of person 100A that have been photographed by the monitoring cameras 7A and 7B. Further, the image processing apparatus 8 identifies person 100A photographed by both monitoring cameras 7A and 7B. The data association unit 83 of the image processing apparatus 8 transmits the identification data acquired through this identification, to the data management unit 15, so that the identification data may be superimposed on the video data, along with the personal attribute data. Note that the identification data contains characteristic data items representing the garment color, garment pattern, figure characteristics, facial characteristics, etc., of person 100A.

Viewing the image superimposed with such characteristic data used as personal attribute data, the security manager can determine whether the garment on the person identified as person photographed by both monitoring cameras 7A and 7B has changed or not. If the garment has changed, the person may be an intruder who has entered the room 1B, along with the authorized person.

Thanks to the linkage of functions, which is achieved in the monitoring system, the security manger can determine whether the number of persons represented by the video data generated by the monitoring camera 7B and displayed on the display screen 700B is larger than the number of persons including person 100A identified as authorized to enter the room 1B. If the number of persons is larger than the number of persons including person 100A, the security manager confirms that at least one intruder has entered the room 1B, along with person 100A, or that at least one has not exit the room 1B trough the security gate 3.

Thus, the linkage of functions of the monitoring system can increase the accuracy of detecting any intruder who enters the room, along with the person authorized to enter the room.

The monitoring system according to this embodiment is configured to display the personal attribute data (metadata), superimposing the same on the video data acquired in real time and the video data stored in a storage unit. Nonetheless, the personal attribute data may either be displayed or not displayed at all. In other words, the monitoring system may operate in one mode to superimpose the personal attributed data on the video data, or in the other mode not to display the personal attribute data at all, in accordance with a setting command coming from the input unit 14.

The personal attribute data may contain some other items such as the age and employment date, in addition to the ID data, name and department. In the case where the personal attribute data is displayed, superimposed on the video data, the items displayed may be changed in number (only the name, for example, may be displayed together with the video data). The data management unit 15 of the storage apparatus 9 can easily change the content or display format of the personal attribute data, merely by modifying a configuration file.

Figure 12:
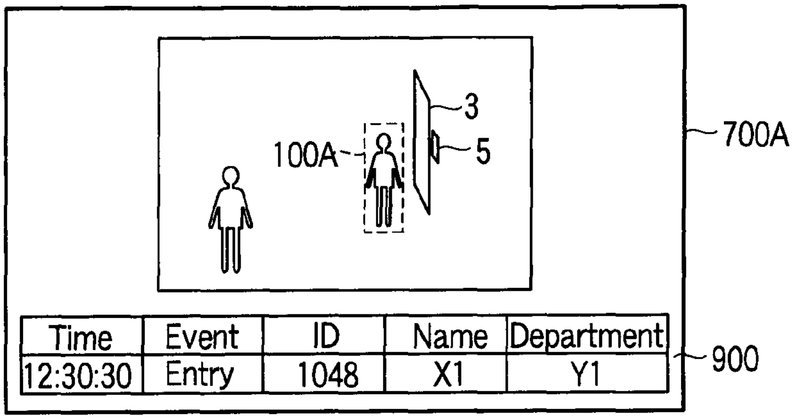
FIG. 12 is a diagram showing other exemplary personal attribute data items used in the other embodiment of the invention.

The monitoring system may be so configured that as shown in FIG. 12, text data 900 of personal attribute data is displayed in the lower part of the screen 700A displaying the personal attribute data (i.e., metadata). In this display format, it is easy for the viewer to confirm that image of authorized person 100A is displayed in association with the text data 900 (i.e., personal attribute data).

(Modified Linkage of Functions)

Figure 13:
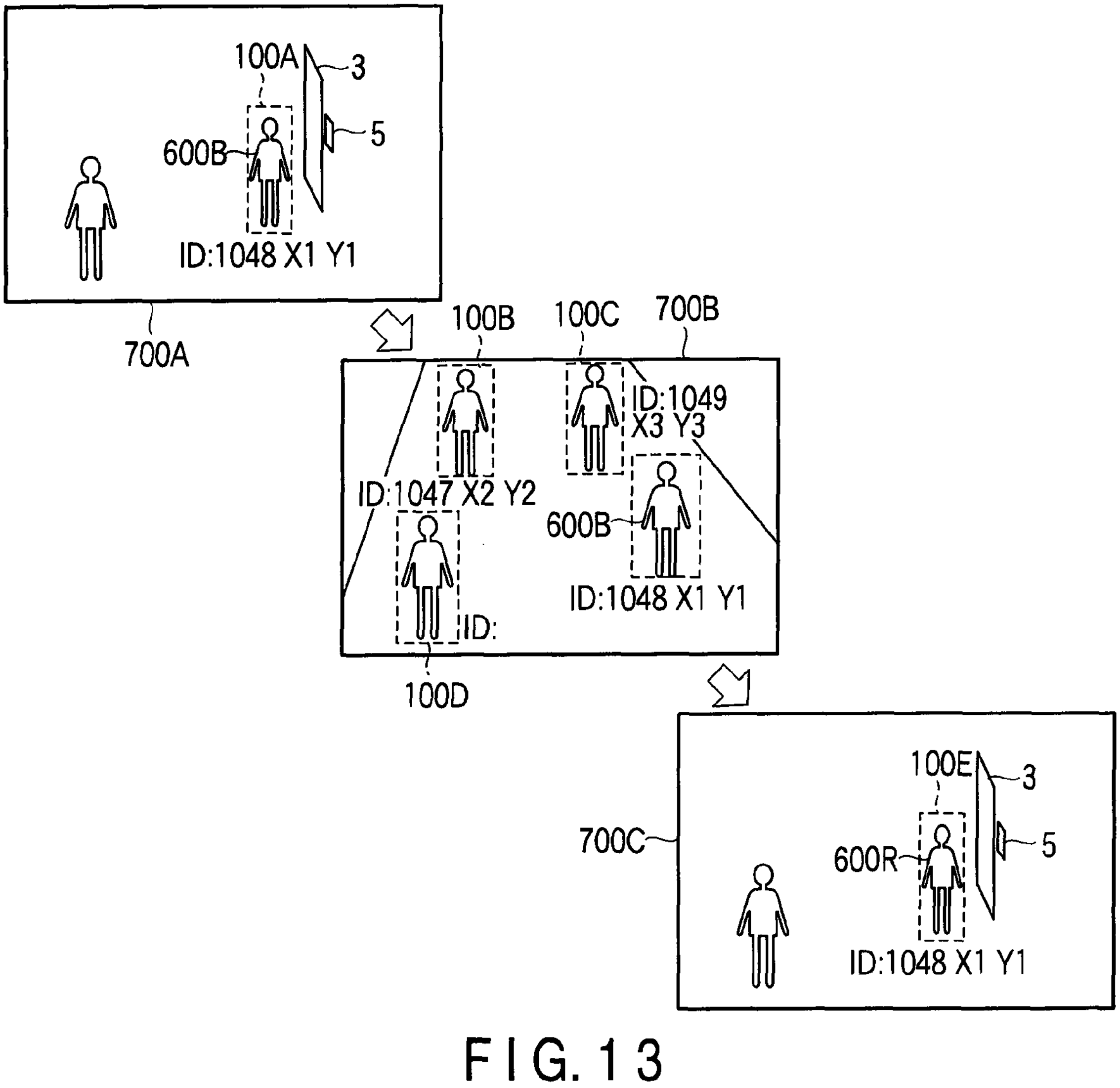
FIG. 13 is a diagram explaining how a person who has cleared prescribed security rules is detected in the other embodiment of the invention.
Figure 14:
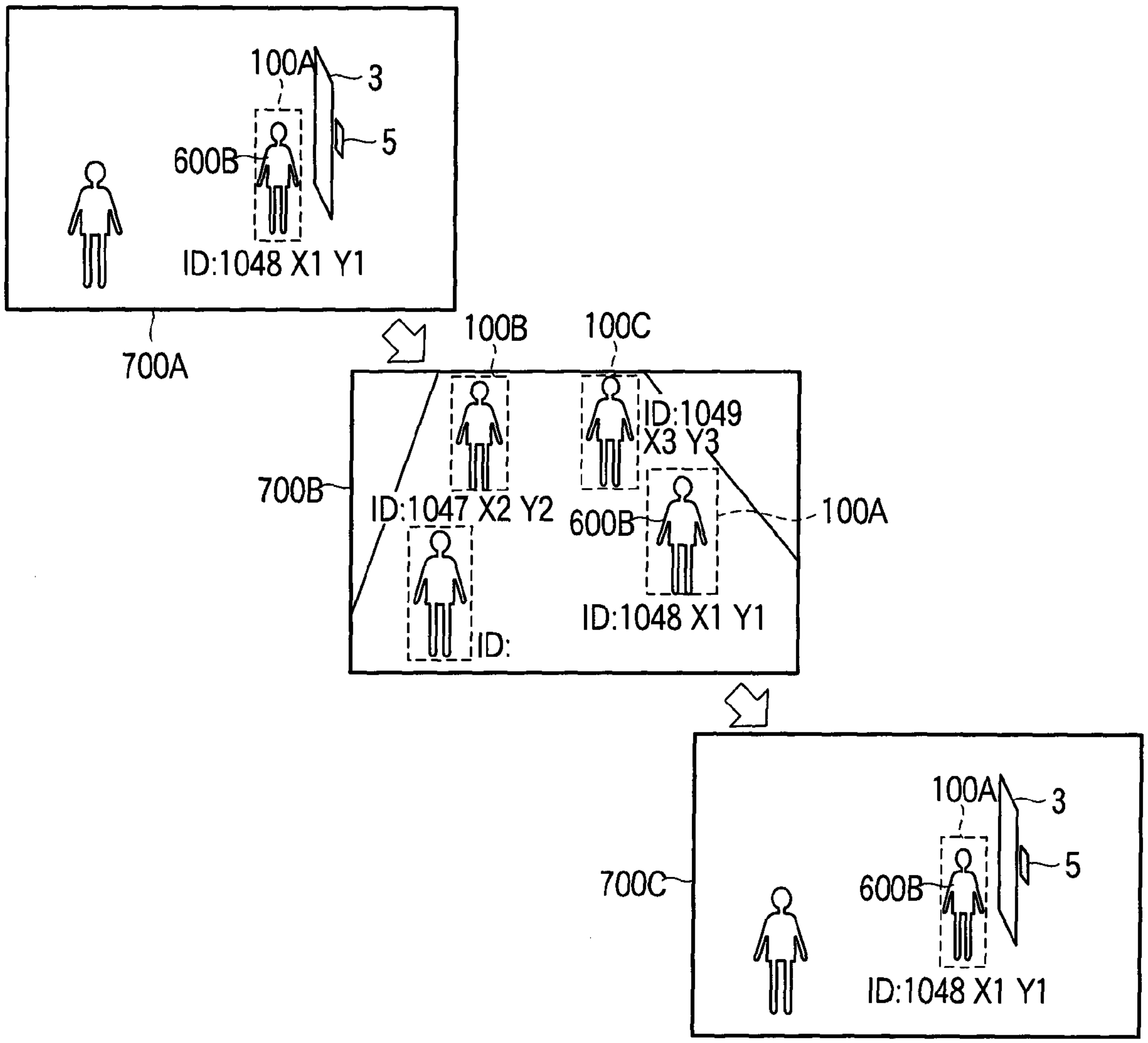
FIG. 14 is a diagram explaining how a person is tracked in the other embodiment of the invention.

FIGS. 13 and 14 are diagrams explaining the linkage of functions of a process performed in a monitoring system having a plurality of monitoring cameras 7A, 7B and 7C.

As shown in FIG. 13, the cameras 7A, 7B and 7C are used to track person 100A in accordance with the personal attribute data (metadata) and personal attribute data, both pertaining to person 100A. In this case, the data management unit 15 of the storage apparatus 9 switches display screens 700A, 700B and 700C, from one to another, each screen displaying the image of person 100A who moves for a period from time T0 to time T20.

First, the data management unit 15 causes the display unit 17 to display the image of person 100A, the monitoring camera 7A photographs at time T0, and the personal attribute data of person 100A, superimposed on the image of person 100A. At this point, the monitoring system extracts the characteristic data representing, for example, the color of the garment person 100A wears, and superimposes the characteristic data on the image of person 100A. More specifically, the display region 600B of person 100A is displayed in, for example, blue in accordance with the characteristic data.

Next, the data management unit 15 causes the display unit 17 to display the image of person 110*a* and the personal attribute data thereof, in the image represented by the video data the monitoring camera 7B generates at time T1. At this point, the display region 600B of person 100A is displayed in blue on the display screen 700B, too, in accordance with the characteristic data extracted.

Moreover, the data management unit 15 causes the display unit 17 to display the image of the person and his or her personal attribute data, superimposed in the image represented by the video data the monitoring camera 7C acquired at time T2. At this point, the monitoring system acquires characteristic data that represents the color (e.g., red) o the garment the person wears. In accordance with this characteristic data, the display region 600R for the person is displayed in red on the display screen 700C.

The linkage of functions, described above, switches the display screen, first to the screen 700A, then to the screen 700B, and finally to the screen 700C, as person 100A moves. The security manager can therefore tack any person who is inferred as an authorized person. Since not only the personal attribute data about person 100A, but also the characteristic data such as the color of the garment is displayed, the manager can confirm that the garment has changed. If the garment has changed in color, person 100E wearing the garment is found different from person 100A even if his or her ID data is identical to that of person 100A. In this case, the ID data of person 100E is identical to that of person 100A. The security manager can therefore determine that person 100E may be an intruder who pretends to be person 100A. The data management unit 15 may be configured to make the display unit 17 to put a label “Intruder” to person 100E who has the same ID data as person 100A but differs from person 100A in the color of garment.

In the monitoring system, the monitoring cameras 7A, 7B and 7C may so cooperate to track person 100A as shown in FIG. 14 based on the personal attribute data (metadata) and the characteristic data. In this case, the personal authentication apparatus 5 need not perform the authentication process once person 100A has been identified as an authorized person.

More precisely, the monitoring cameras 7A, 7B and 7C are cooperate, tacking person 100A as he or she moves, and person 100A may be recognized as an authorized person on the display screens 700A to 770C. In this case, the personal identification is not performed when person 100A walks from one room into another. That is, the data management unit 15 may release the electromechanical lock 2 and thus allow person 100A to pass through the security gate 3, without using the entry/exit management apparatus 6. Further, the data management unit 15 may give the personal attribute data to the entry/exit management apparatus 6, causing the apparatus 6 to release the electromechanical lock 2.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A monitoring system with a camera configured to photograph an area which is close to a security gate, the system comprising:

a personal authentication apparatus provided close to the security gate and configured to authenticate a person to be allowed to pass through the security gate;

a camera configured to photograph an area which is located close to the security gate, and in which the personal authentication apparatus is provided;

an entry/exit management apparatus configured to release an electromechanical lock of the security gate when the person is authenticated by the personal authentication apparatus as a person authorized to enter a room, and also configured to acquire personal attribute data on the authenticated person;

an image storage apparatus configured to store and manage data;

an image processing apparatus configured to extract image data on a person from video data transmitted from the camera, configured to produce metadata of the video data when the personal attribute data is transmitted from the entry/exit management apparatus, the metadata including man-region coordinate data on the person and the personal attribute data, and configured to transmit the metadata along with the video data to the image storage apparatus; and an apparatus which in a case where the person authenticated by the personal authentication apparatus passes through the security gate for a first time, and it is determined based on video data obtained by photographing the authenticated person with a plurality of cameras that the person photographed before passing through the security gate is identical to the person photographed after passing through the security gate, releases the electromechanical lock of the security gate without authentication by the personal authentication apparatus, when the authenticated person passes through the security gate from next time onward.

2. The system according to claim 1, wherein the image storage apparatus is configured to use part of the personal attribute data included in the metadata, as a retrieval key, to retrieve a video scene obtained by photographing the person associated with the personal attribute data, from video data stored in the image storage apparatus, and then display the video scene on a display.

3. A system for monitoring persons, comprising:

a personal authentication apparatus provided close to a security gate and configured to authenticate a person to be allowed to pass through the security gate;

a camera configured to photograph an area which is located close to the security gate, and in which the personal authentication apparatus is provided;

an entry/exit management apparatus configured to release an electromechanical lock of the security gate when the person is authenticated by the personal authentication apparatus as a person authorized to enter a room, and also configured to acquire personal attribute data on the authenticated person;

an image storage apparatus configured to store and manage data; and an image storage processing apparatus which includes:

a person extraction unit configured to extract image data on a person from video data transmitted from the camera;

a person identification unit configured to access the personal authentication apparatus, to thereby identify the authenticated person based on a position and a movement of the person associated with the image data extracted by the personal extraction unit; and a metadata generation unit configured to produce metadata to be allocated to the video data on the authenticated person, using the personal attribute data, when the personal attribute data is transmitted from the entry/exit management apparatus, wherein the image storage apparatus is further configured to store and manage the video data and metadata transmitted from the image processing apparatus, and superimpose the personal attribute data on the video data when an image of the authenticated person is displayed on a display.

4. The system according to claim 3, wherein the metadata generation unit is further configured to allocate, in a case where a plurality of cameras are operated in cooperation with each other, the personal attribute data which is allocated to video data obtained by photographing the authenticated person with a first one of the plurality of cameras, to video data obtained by photographing the authenticated person with a second one of the plurality of cameras, and configured to enable the personal attribute data to be superimposed on each of images of the authenticated person, which correspond to the video data obtained by photographing the authenticated person with the first camera and the video data obtained by photographing the authenticated person with the second camera, respectively, when said each of the images of the authenticated person is displayed on the display after it is determined that the person photographed by the first camera is identical to the person photographed by the second camera.

5. The system according to claim 4, wherein the metadata generation unit is configured to allocate attribute data which is any of characteristic amounts of a color and a pattern of a dress worn by the authenticated person and a figure and a face of the authenticated person, as the personal attribute data, to the video data on the authenticated person, and enable the personal attribute data to be superimposed on said each of the images when said each image is displayed on the display.

6. The system according to claim 5, wherein the image processing apparatus is configured to check consistency of the personal attribute data allocated to video data on the authenticated person which is obtained by photographing the authenticated person with an arbitrary one of the plurality of cameras, with a characteristic amount of the authenticated person which is obtained by photographing the authenticated person with another one of the plurality of cameras after the authenticated person moves, and determine, when the characteristic amounts obtained by photographing the authenticated person before and after the authenticated person passes through the security gate are different from each other, that the person photographed before passing through the security gate is different from the person photographed after passing through the security gate.

7. The system according to claim 3, wherein the image storage apparatus is configured to cause the personal attribute data to be selectively imposed on said each image of the authenticated person or cause the personal attribute data to be undisplayed, when said each image of the authenticated person is displayed based on video data obtained in real time and the video data stored in the image storage apparatus.

8. The system according to claim 3, wherein the metadata generation unit is configured to convert the personal attribute data into text data instead of superimposing the personal attribute data on said each image of the authenticated person, and cause said each image and the text data to be displayed along with each other.

9. The system according to claim 3, further comprising:

an apparatus which in a case where the person authenticated by the personal authentication apparatus passes through the security gate for a first time, and it is determined based on video data obtained by photographing the authenticated person with a plurality of cameras that the person photographed before passing through the security gate is identical to the person photographed after passing through the security gate, releases the electromechanical lock of the security gate without authentication by the personal authentication apparatus, when the authenticated person passes through the security gate from next time onward.

* * * * *